TURNPIKE TURN SIGNAL TIMING AND CANCELLING ASSEMBLY
Filed Sept. 3, 1965
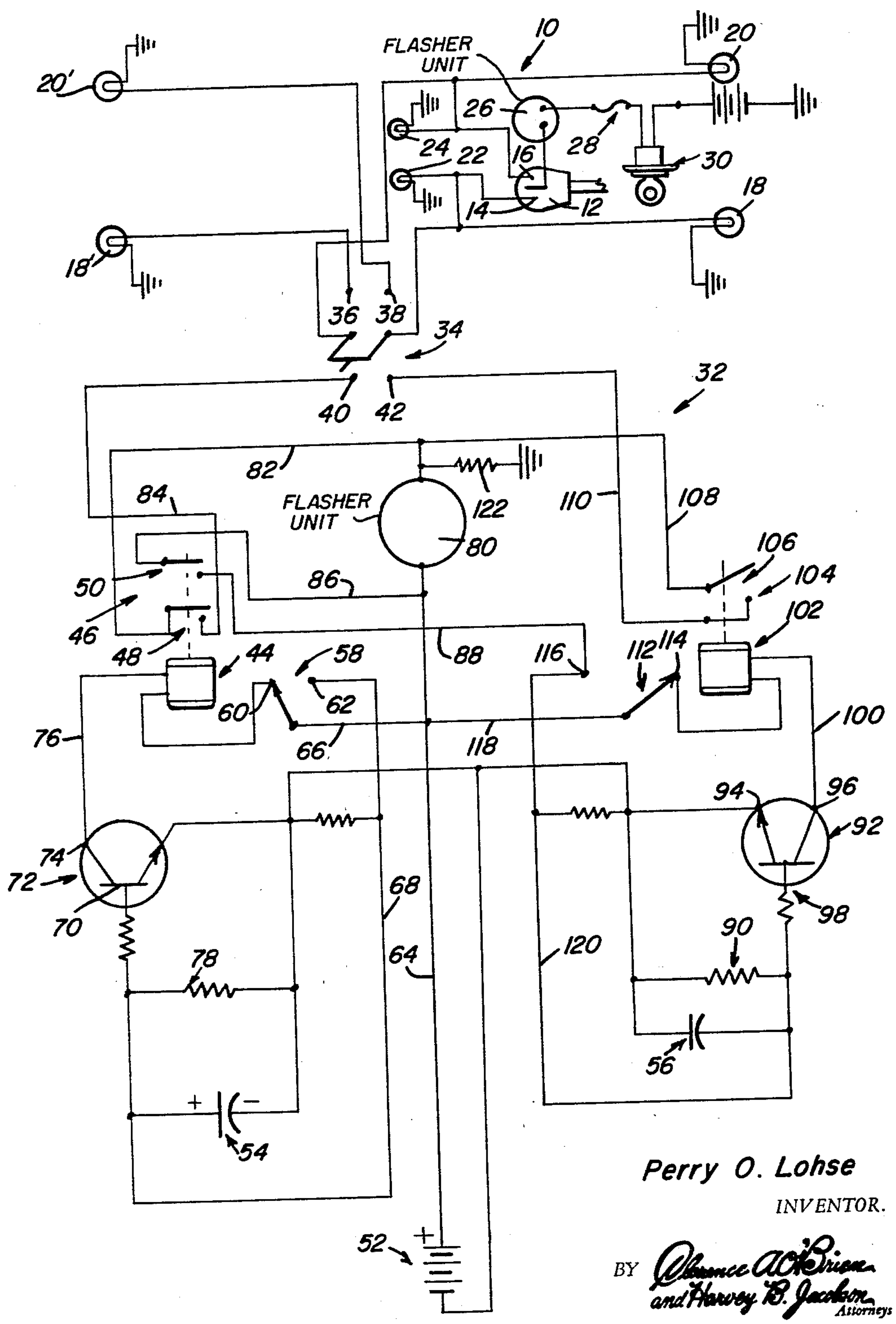
Perry O. Lohse
INVENTOR.
BY Clarence A. O'Brien and Harvey B. Jacobson
Attorneys

United States Patent Office 3,396,367

Patented Aug. 6, 1968

3,396,367

TURNPIKE TURN SIGNAL TIMING AND CANCELLING ASSEMBLY

Perry O. Lohse, 529 Richmond Road, Cleveland, Ohio 44124

Filed Sept. 3, 1965, Ser. No. 484,835
16 Claims. (Cl. 340—55)

ABSTRACT OF THE DISCLOSURE

A manually actuatable switch causes a first transistor to conduct through a relay coil connected in the series with the transistor collector. The relay contacts are closed thereby permitting current flow from a flasher unit to a signal lamp. An RC timing circuit causes the transistor to conduct for a preselected time interval. Energization of the relay coil causes the charging of a capacitor which in turn forward biases a second transistor at the termination of the first time interval. Conduction by the second transistor causes a current flow through a relay coil thereby closing a set of associated switch contacts. The closing of the switch permits current to flow from the flasher unit to a second signal lamp for a second predetermined time interval governed by the discharge rate of the aforementioned capacitor.

This invention relates generally to an electronic control circuit for a motor vehicle turn signal system, and more particularly to a control circuit which is concerned with the timing of a first actuated turn signal, automatically cancelling this first signal while at the same time automatically activating the other turn signal, timing the same and finally cancelling the second turn signal.

The conventional turn signal systems in use in motor vehicles include a manually operated turn switch which may be activated by the operator in order to connect the vehicle battery through a flasher unit to a set of turn lights. The system also includes a mechanically operated cancelling switch which is responsive to a turn of the steering wheel in order to effect the return of the turn switch to the inoperative position. This system has proved to be effective in city driving where right angle turns are commonly made. However, in turnpike driving, the operator normally uses the turn signal switch to indicate intended movement from one lane to another. During this type of maneuver, the steering wheel is not generally moved sufficiently to operate the mechanical cancelling switch and hence the operator must manually return the turn signal switch to the inoperative position. In many instances, the operator maneuvers from lane to lane and forgets to manually cancel the turn signal, in which case, the continuing signal constitutes a severe hazard to following traffic because of the false indication of intended movement.

The present invention is intended to obviate the aforementioned traffic hazard by providing an electronic apparatus which may be activated upon entering a turnpike, thereafter allowing the operator to automatically signal for a left or passing turn and then a right or re-entering turn. This invention is especially intended to be used for turnpike travel wherein vehicles do not meet on-coming traffic and therefore only the rear turn signal lights are affected thereby. However, it will be apparent from the description of the invention that the front turn signal lights could be included if desired.

Accordingly, it is an object of the present invention to provide an electronic control circuit which may be included in new vehicles or installed in existing motor vehicles so as to effect automatic operation of the turn signals necessary to indicate the passage of another vehicle during high speed turnpike driving.

In accordance with the above object, it is an object of the present invention to provide a turn signal control circuit which upon activation automatically signals a left turn for a predetermined time interval, cancels the left turn signal and activates the right turn signal for a predetermined time interval, and finally cancels the right turn signal.

A further object of the present invention is to provide an automatic signalling turn signal control circuit for motor vehicles which includes a cycle interrupting switch to prolong the operation of a turn signal cycle if desired.

It is a further object of the present invention to provide a control circuit for programming a turn signal pattern or cycle which may be selectively activated by the motor vehicle operator.

It is a still further object of the present invention to provide a control circuit for use in a motor vehicle turn signal system which is simple and compact in construction, efficient in operation and economical to manufacture.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

The figure of the drawing is a schematic diagram of the electrical circuit emboding the present invention.

Referring to the drawing, numeral 10 refers generally to a conventional motor vehicle turn signal indicating unit. The turn signal unit 10 includes a manually operated turn switch 12 shown at neutral position between a pair of contacts 14 and 16 respectively associated with rear turn lamps 18 and 20 and front lamps 18' and 20'. Also associated with contacts 14 and 16 are dashboard indicator lights 22 and 24. The switch 12 is connected to an energy source such as the vehicle battery through a conventional flasher unit 26, fuse 28 and ignition switch 30. Thus, the flasher unit 26 will effect intermittent energization of the aforementioned turn lamps. The manually operated turn signal switch 12 may be restored to the neutral position by a mechanical arrangement associated with the automobile steering wheel to cancel the turn lamps upon a movement of the steering wheel through a substantial arc.

It will be appreciated, of course, that during turnpike travel manual actuation of the switch 12 to a left turn position is usually effected to indicate that the automobile is about to pass another automobile. However, the slight movement of the steering wheel necessary to effect this passing movement will not activate the mechanical cancelling arrangement and therefore either the left turn signal or the right turn signal, which is flashed on to indicate movement back into line, will remain on unless the switch 12 is manually restored to inoperative neutral position. In order to provide for automatic cancelling operation, the present invention contemplates the provision of an electronic circuit generally indicated as 32.

In order to utilize the automatic cycling circuit 32 in conjunction with the conventional turn signal unit 10, a double pole, double throw switch 34 is provided. The switch 34 may be moved to contacts 36 and 38 for normal operation of the turn signal system or may be moved to contacts 40 and 42 for automatic cancelling operation. The switch 34 may be suitably placed on the dashboard of the motor vehicle and will enable the operator to switch in the automatic cycling circuit 32 upon entering turnpike traffic.

The automatic cycling circuit comprises a first relay 44 having a normally opened relay switch section 46 including two switches 48 and 50. A capacitor 54 may be connected across the battery 52 by single pole double throw switch 58. In the position shown, the switch 58 presents an open circuit to the flow current from battery 52 to capacitor 54. When switch 58 is moved from contact 60 to contact 62, however, the capacitor 54 is then charged by the battery 52, over electrical leads 64, 66 and 68. Upon release of switch 58, it will move from contact 62 back to contact 60 by the usual spring biased arrangement and the capacitor 54 will then begin to discharge at a rate determined by resistor 78. The capacitor 54 is connected by a bias resistor to the base 70 of transistor 72. The transistor 72 is of the NPN type and is biased into a conductive state by the positive charge stored in capacitor 54 and applied to the base 70. Therefore, when the switch 58 returns to contact 60, the transistor 72 begins to conduct causing a current flow to the collector 74 over lead 76 from relay 44 since the relay circuit is then completed by switch 58 moving back to contact 60. The relay 44 is thereby energized closing switches 48 and 50.

Resistor 78 is provided to limit the discharging rate of capacitor 54, and in addition, resistor 78 in conjunction with capacitor 54, provides an R-C timing circuit which ultimately controls the time-delay before the transistor 72 returns to a non-conducting state when the charge on the capacitor 54 drops below bias value. The parameters of resistor 78 and capacitor 54 are determined by the time period of required discharge of the capacitor to base 70. It is anticipated that approximately ten seconds operation of the transistor is required and therefore capacitor 54 may be 1,000 microfarads and resistor 78, 10K ohms.

When the switch 48 is closed, current will flow over lead 64 to the conventional flasher unit 80 and then over leads 82 and 84 to contacts 40, through switch 34 and to the left rear turn signal indicator 20. Thus, it is apparent that upon moving switch 58 to contact 62 and then back to contact 60, the left rear signal indicator 20 will be operated for approximately ten seconds.

When the relay 44 is energized and switch 50 closed, current is also allowed to flow from battery 52 over leads 64, 86 and 88 to charge capacitor 56. The resistor 90 is provided for a purpose similar to resistor 78 described above. A NPN transistor 92 is provided for operation in conjunction with capacitor 56, and includes emitter connection 94, collector connection 96 and base connection 98. The capacitor 56 is charged during the ten second interval when switch 50 is closed, and when switch 50 is opened upon deenergization of relay 44, the capacitor 56 will discharge in order to time the conductive period of transistor 92. The time of discharge of capacitor 56 is a matter of choice and in this instance an approximately 30 second discharge period is desired. Therefore, the capacitor 56 is preferably 2,000 microfarads and the resistor 90 is preferably 30K ohms. It will be appreciated, of course, that the charge stored in capacitor 56 will apply a bias voltage to base 98 through a bias resistor so that the transistor 92 will conduct as long as its collector circuit is complete.

When the transistor 92 is conducting, current will flow to the collector connection 96 over lead 100 from a second relay 102. The relay 102 controls the single pole throw switch 104, including contact 106. Thus, when the relay 102 is energized by transistor 92 the switch 104 is closed, and current will then flow therethrough from battery 52 over leads 64, 108 and 110 to contact 42 of switch 34. Thus the right rear turn signal indicator 18 will be activated immediately after the left rear turn signal indicator 20 is deactivated and will be maintained on for 30 seconds.

It will be apparent that the time period of ten seconds for left rear turn signal indicator 20 and thirty seconds for turn signal indicator 18 will normally allow sufficient time for the operator to move out of the right lane of traffic, past the car ahead of him and then move back to the right lane of traffic, after which the automatic cycling circuit will shut itself off. This will happen when capacitor 56 has discharged to a cut-off valve, at which time the transistor 92 will be rendered nonconductive and the relay 102 deenergized, thus allowing switch 104 to open.

If it is discovered when passing another car that additional time is needed for indicating a right turn, the single pole double throw switch 112 is provided. Movement of the switch from contact 114 to contact 116 will connect the battery 52 across the capacitor 56 over leads 64, 118 and 120, thereby charging the capacitor 56 once again to full capacity. Subsequent movement of switch 112 from contact 116 to contact 114 will therefore extend the conductive period of transistor 92 for another thirty seconds to prolong operation of right rear turn signal indicator 18.

It will be apparent, from the foregoing that actuation of the switch 58 at any time during the operation of the automatic cycling circuit will interrupt the cycling and cause a full repetition thereof. Actuation of the switch 112 on the other hand will interrupt and repeat only the right turn signal portion of the cycle. It will also be appreciated, of course, that the flasher unit 80, and battery 52 are conventional equipment. The resistor 122 is added to compensate for the removal of the front lamp from the circuit during automatic cancelling operation. In the event that the vehicle does not have existing indicator lamps, auxiliary lamps may be furnished and in this event a flasher unit must be added and the compensating resistor 122 is not necessary. Further, it will be apparent that when the switch 34 is moved to contacts 36 and 38 the automatic cycling circuit will not be functional and will not in any way interfere with normal turn signal operation. An alternate installation (not illustrated) will be to eliminate resistor 122, and change switch 34 to a double pole, single throw switch, making no separation of front and rear lamps at 36 and 38, thus switching control circuit to both front and rear lamps simultaneously. If the unit is to be used in a motor vehicle that does not have its own signal indicator lamps, contact points 40 and 42 would be directly connected to the auxiliary indicator lamps and the switch 34 would of course be unnecessary.

It will be appreciated, of course, that the times of the various cycles of operation of the automatic cycling circuit may be varied merely by changing the operating parameters of the various electrical components described above. The foregoing parameters have accordingly been given merely as an example of one circuit actually constructed and adapted for a cycle of ten seconds left turn signalling and thirty seconds right turn signalling.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a vehicle turn signal system having a pair of turn signal lamps, a manual turn switch for alternative operation of the signal lamps, and mechanical means for interrupting operation of the signal lamps, a lane changing signal control circuit comprising cycle timing means for establishing a first predetermined period, selective means for disabling the manual turn switch and operatively connecting said timing means to one of the signal lamps for energization thereof during said first predetermined period, sequentially actuated timing means operatively connected to said other of the signal lamps for energization thereof during a second predetermined period, and means responsive to termination of said first predetermined period for initiating operation of the sequentially actuated timing means, whereby said signal lamps are sequentially illuminated and cancelled.

2. The combination of claim 1 wherein said selective means comprises an operational control switch connected to the signal lamps and displaceable between two operative positions, and means connecting said control switch to the timing means for respectively controlling operation of the signal lamps only when the control switch is in one of said operative positions.

3. In combination with a vehicle turn signal system having a pair of turn signal lamps, a manual turn switch for alternative operation of the signal lamps, and mechanical means for interrupting operation of the signal lamps, a lane changing signal control circuit comprising cycle timing means for establishing a first predetermined period, selective means for disabling the manual turn switch and operatively connecting said timing means to one of the signal lamps for energization thereof during said first predetermined period, sequentially actuated timing means operatively connected to said other of the signal lamps for energization thereof during a second predetermined period, and means responsive to termination of said first predetermined period for initiating operation of the sequentially actuated timing means, whereby said signal lamps are sequentially illuminated and cancelled, said selective means comprising an operational control switch connected to the signal lamps and displaceable between two operative positions, and means connecting said control switch to the timing means for respectively controlling operation of the signal lamps only when the control switch is in one of said operative positions, each of said timing sections comprising, a current conducting device, relay means connected to the current conducting device, capacitor means connected to the current conducting device for biasing thereof to a conductive state, discharge regulating means connected to the capacitor means for prescribing the duration of said conductive state, a source of voltage connected by the relay means when energized to one of the signal lamps, charging switch means alternatively connecting said source of voltage to the capacitor means and the relay means for charging the capacitor means or energizing the relay means while the capacitor means discharges, and relay switch means responsive to energization of the relay means in one of the timing means for charging the capacitor means in the other timing means.

4. The combination of claim 3 wherein a common battery forms the source of voltage for both of the timing means and the charging switch means in the other of the timing means is operative to prolong the second predetermined period.

5. In combination with a vehicle turn signal system having a pair of turn signal lamps, a manual turn switch for alternative operation of the signal lamps, and mechanical means for interrupting operation of the signal lamps, a lane changing signal control circuit comprising cycle timing means for establishing a first predetermined period, selective means for disabling the manual turn switch and operatively connecting said timing means to one of the signal lamps for energization thereof during said first predetermined period, sequentially actuated timing means operatively connected to said other of the signal lamps for energization thereof during a second predetermined period, and means responsive to termination of said first predetermined period for initiating operation of the sequentially actuated timing means, whereby said signal lamps are sequentially illuminated and cancelled, each of said timing means comprising, a current conducting device, relay means connected to the current conducting device, capacitor means connected to the current conducting device for biasing thereof to a conductive state, discharge regulating means connected to the capacitor means for prescribing the duration of said conductive state, a source of voltage connected by the relay means when energized to one of the signal lamps, charging switch means alternatively connecting said source of voltage to the capacitor means and the relay means for charging the capacitor means or energizing the relay means while the capacitor means discharges, and relay switch means responsive to energization of the relay means in one of the timing means for charging the capacitor means in the other timing means.

6. The combination of claim 5 wherein a common battery forms the source of voltage for both of the timing means and the charging switch means in the other of the timing means is operative to prolong the second predetermined period.

7. An automatic cycling turn signal circuit having first and second indicating means adapted to be connected to an automotive turn indicator circuit having an energy source, said automatic cycling circuit comprising means for connecting said energy source to said first indicating means for a predetermined time interval and means for connecting said energy source to said second indicating means for a predetermined time interval commencing immediately after the first predetermined time interval period thereby selectively activating said first and second indicating means, said first-named connecting means including a capacitor, switch means for selectively connecting said capacitor across said energy source whereby said capacitor will be charged while said switch means is closed and will discharge when said switch means is opened, a transistor connected to be biased into conductivity by said capacitor, relay means connected to said transistor for energization by current conducted therethrough, first contact means responsive to energization of said relay means for closing a circuit between said first indicating means and said energy source, said transistor ceasing to conduct when said capacitor is discharged to open the circuit between said first indicating means and said energy source.

8. The apparatus of claim 7 including second contact means responsive to energization of said relay means for closing a circuit between said energy source and said second-named connecting means.

9. An automatic cycling turn signal circuit having first and second indicating means adapted to be connected to an automotive turn indicator circuit having an energy source, said automatic cycling circuit comprising means for connecting said energy source to said first indicating means for a predetermined time interval and means for connecting said energy source to said second indicating means for a predetermined time interval commencing immediately after the first predetermined time interval period thereby selectively activating said first and second indicating means, said second-named connecting means including a capacitor, means for connecting said capacitor across said energy source for charging said capacitor, a transistor connected to be biased into conductivity by said capacitor, relay means connected to said transistor for energization by current conducted therethrough, contact means responsive to energization of said relay means for closing a circuit between said second indicating means and said energy source, said transistor ceasing to conduct when said capacitor is discharged to open said circuit between said second indicating means and said energy source.

10. An automatic cycling turn signal circuit having first and second indicating means adapted to be connected to an automotive turn indicating circuit having an energy source, comprising a first capacitor, switch means for selectively connecting said first capacitor across said energy source whereby said capacitor will be charged while said switch means is closed and discharge when said switch means is opened, a first transistor connected to be biased into conductivity by said first capacitor, relay means connected to said first transistor for energization by current conducted therethrough, first contact means responsive to energization of said relay means for closing a circuit between said first indicating means and said energy source, said first transistor ceasing to conduct when said first capacitor is discharged to open the circuit between said first indicating means and said energy source, a second capacitor, second contact means responsive to energization of said relay means for closing a circuit between said energy source and said second capacitor whereby said second capacitor will be charged, a second transistor connected to be biased into conductivity by said second capacitor, a relay connected to said second transistor for energization by current conducted therethrough, a contact responsive to energization of said relay for closing a circuit between said second indicating means and said energy source, said second transistor ceasing to conduct when said second capacitor is discharged to open the circuit between said second indicating means and said energy source.

11. A timing apparatus comprising a voltage source, first switch means, timing means connected in circuit with said voltage source, a current switching device having an input and output, means for selectively connecting said timing means and said input for permitting current flow from said output for a first preselected time interval, means energizable in response to said current flow for actuating said first switch means, current interrupter means having an input and output, said interrupter input being connected with said source, said interrupter output being connected with said first switch means, first electric signal means connected in circuit with said first switch means for generating a first pulsating signal therefrom for said first preselected time interval, means automatically operative in response to energization of said energizable means and second electric switch means cooperating therewith for generating a second pulsating signal during a second preselected time interval, said second time interval beginning upon the termination of said first time interval.

12. The apparatus set forth in claim 11 wherein said means for generating a second pulsating signal comprises a second current switching device having an output, second switch means, means energizable in response to current flow from said output for actuating said second switch means, said current interrupter output being connected with said second switch means, said second electric signal means connected in circuit with said second switch means for generating said second pulsating signal therefrom for said second preselected time interval.

13. The apparatus set forth in claim 12 wherein said first and second electric signal means are signal lamps.

14. The apparatus set forth in claim 13 together with a manually operable vehicle turn indicator control means, selector means for disconnecting said first and second signal lamps from said first and second switch means respectively, said selector means further adapted for connecting said signal lamps to said control means.

15. In combination with a vehicle having a pair of rear signal lamps and a source of voltage from which said lamps are energized, a signal control circuit comprising relay means connecting said source to the lamps for sequential energization during an operating cycle, timing means connected to the relay means for establishing separate illuminating periods of predetermined duration during said operating cycle when the lamps are energized one at a time, and momentary switch means connected to the timing means for initiating said operating cycle.

16. The combination of claim 15 including additional switch means connected to the timing means for prolonging the illuminating period during energization of only one of said lamps.

References Cited

UNITED STATES PATENTS 3,110,011 11/1963 Burson -------------- 340—56

JOHN W. CALDWELL, *Primary Examiner.*

ALVIN H. WARING, *Assistant Examiner.*